(No Model.)
F. SCHEIDIG.
SPECTACLE JOINT.
No. 367,552. Patented Aug. 2, 1887.
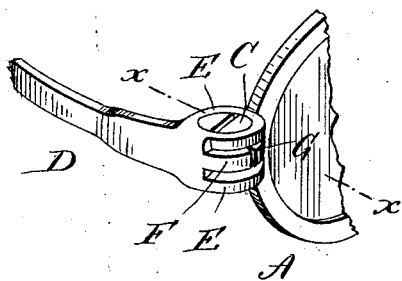
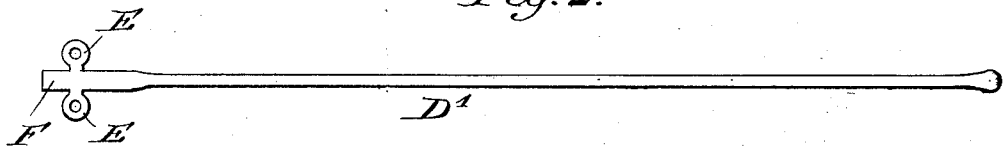
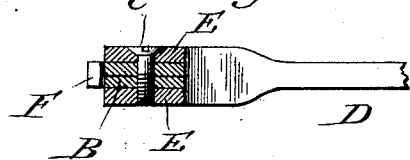
WITNESSES:
John A. Ellis
E. M. Clark
INVENTOR:
F. Scheidig
BY Munn &Co
ATTORNEYS.

UNITED STATES PATENT OFFICE.

FREDERICK SCHEIDIG, OF NEW YORK, N. Y.

SPECTACLE-JOINT.

SPECIFICATION forming part of Letters Patent No. 367,552, dated August 2, 1887.

Application filed September 24, 1886. Serial No. 214,441. (No model.)

*To all whom it may concern:*

Be it known that I, FREDERICK SCHEIDIG, of the city, county, and State of New York, have invented a new and Improved Spectacle-Joint, of which the following is a full, clear, and exact description.

This invention relates to the construction of the joints in spectacles by which the temples are pivotally connected to the end pieces on the lenses, the object being to produce a simpler, stronger, and more easily attachable joint.

The invention consists in making the temple from a blank formed with oppositely-projecting ears adapted to be bent parallel with each other and embrace the eye on the end piece, and with a lug arranged to strike the stop-shoulder on the end piece, in the usual manner.

Reference is to be had to the accompanying drawings, forming a part of this specification, in which similar letters of reference indicate corresponding parts in all the figures.

Figure 1 is a perspective view illustrating my improved spectacle-joint, enlarged. Fig. 2 is a plan of the blank from which the temple is formed. Fig. 3 is a sectional view of the joint, taken on the line $x$ $x$, Fig. 1.

Heretofore in spectacle-joints the temple has been formed with an eye, which was held between the sections of the split end piece on the bow or lens, the parts being held together by a pivotal screw. In forming the joint this construction necessitated the insertion of the temple eye between the sections of the split end piece and holding together the said sections while the pivotal screw was turned home, until the completion of which latter operation the joint was not effected nor the parts in place.

In my improved construction the spectacle-bow A, carrying the lens, is provided with the usual split end piece—or the latter may be attached directly to the lens, as in rimless spectacles—and said end piece is formed with the eye B (shown in section in Fig. 3) for receiving the pivotal screw C.

The temple D is made from the blank D', which is formed at its forward end with the oppositely-projecting ears E E and the end lug, F. In the completed temple the ears E E are bent over parallel with each other and receive between them the eye B on the split end piece, the pivotal screw being passed through the apertures in the ears E E and through the eye B to hold the parts together. The aperture in one of the ears E is threaded to engage the threaded end of the screw C. The lug F on the end of the temple is bent to the curve of the eye B and is adapted to strike the stop-shoulder G on the end piece, so that when the temple is opened for use its movement is limited, as usual. By thus arranging the eye on the split end piece between the ears on the temple a strong and simple joint is obtained with the aid of the pivotal screw. Further, the operation of effecting the joint is greatly facilitated, in that all the parts are held in place without the use of the pivotal screw on inserting the split section of the end piece between the ears or cheek-pieces on the temple, the application of the screw being thus rendered extremely convenient.

The stiffness of the joint is regulated in the ordinary manner by turning the pivotal screw and thus clamping the eye B between the cheek-pieces on the temple.

Having thus described my invention, what I claim as new, and desire to secure by Letters Patent, is—

1. In a spectacle-joint, the combination, with the lens end piece having the eye B, of the temple D, provided with the cheek-pieces E E, embracing the eye B, and with the stop-lug F, and of the pivot C, substantially as shown and described.

2. In a spectacle-joint, the combination, with the split end piece formed with the eye B and with the stop-shoulder G, of the temple D, provided with the cheek-pieces E E, arranged to embrace the eye B, and with the stop-lug F, and of the pivotal screw C, arranged to clamp the ears E E on the eye B, substantially as specified.

3. The temple formed with apertured ears bent parallel with each other and with a lug, F, forming a stop, substantially as shown and described.

FREDERICK SCHEIDIG.

Witnesses:
EDGAR TATE,
C. L. BURGER.